3,321,327
PROCESS FOR THE DENSIFICATION OF
CARBONACEOUS BODIES
René Blanchard, Saint-Martin-le-Vinoux, Louis Bochirol, Grenoble, Claude Moreau, Seyssinet-Pariset, and Joseph Philippot and Pierre Blum, Grenoble, France, assignors to Commissariat à l'Energie Atomique, Paris, Seine, France
No Drawing. Filed May 20, 1963, Ser. No. 283,659
Claims priority, application France, May 22, 1962, 898,360; May 28, 1962, 898,979; Dec. 5, 1962, 917,577
(Filed under Rule 47(a) and 35 U.S.C. 116)
4 Claims. (Cl. 117—46)

The present invention relates to a process for the densification of carbonaceous bodies by thermal cracking of hydrocarbons.

The substantial advantages which may be gained, especially insofar as nuclear applications are concerned, by making provision for graphite having both a high density and a residual porosity which is both fine and uniform, are already widely acknowledged.

It is well known that the density of graphite determines its neutronic effectiveness as a moderator or reflector. Graphite having low density produces a reactivity loss as a result of neutron escape and has an influence on the uranium/graphite ratio, consequently also on capital expenditure and on the cost price of power. On the other hand, graphite material which has sufficient density affords improved mechanical characteristics which in turn have a favorable influence on the design of the stack of moderator material. It is therefore of great advantage to be able to have available for the construction of nuclear reactors graphite materials having a density which is as high as possible.

In the same field of application, it is desirable to employ graphite having fine and uniform porosity when the heat-transfer fluid is a liquid metal or a molten salt, in order to limit the depth of penetration thereof in the graphite. When the coolant is a gas, it is known that, on account of considerations of reaction kinetics, it is of greater advantage to provide a material having as small a number of large pores as possible in order to reduce graphite corrosion either by the heat-transfer gas or its impurities.

Finally, by way of semi-industrial product, a graphite material or carbonaceous support which does not comprise any coarse porosity is essential for the practical application of the methods of preparation of impervious graphite by means of impregnation with certain thermosetting products.

In the majority of prior art methods for shaping carbonaceous supports under such conditions as to obtain a pre-determined pore spectrum, the shaping operation is carried out by extrusion or pressing with coal tar pitch as a binder. The pitch is mixed when hot with the body material which is usually petroleum coke, in proportions which either reach or exceed 20% by weight of the mixture. A coal tar pitch is usually chosen which contains as low a proportion of volatile substances as possible. The result thereby achieved is that the baked support contains a proportion of carbon resulting from the coking of the binder which is in the vicinity of 10%. In point of fact, practically all the "closed porosity," that is to say the porosity which is inaccessible to gases, and the "fine porosity" consisting of pores having a diameter which is less than one tenth of a micron, result precisely from the presence of the coked binder residue. It will be understood that closed porosity and even fine porosity as thus defined are absolutely undesirable for the purpose of ensuring good internal densification as a result of thermal decomposition of methane gas.

The use of other binding agents such as phenolic resins or thermosetting agents of various types usually complicates the operations involved in the shaping preparation and furthermore does not substantially modify the results. These binding agents must be employed in proportions which cannot be lower than 10% and are mostly of the order of 15%. The disadvantages mentioned above as regards the porosities obtained continue to exist.

As regards the densification itself, the traditional processes which are adapted for use on a large scale essentially consist in impregnating with coal tar pitch, either in one or a number of operations, the so-called "baked" intermediate product which results from the treatment at a temperature in the vicinity of 1,000° C. of a mixture of coke and pitch which is shaped either by pressing or extrusion. After completion of one or a number of impregnation treatments, a further baking operation is then carried out followed by the graphitization treatment at high temperature. If the number of successive impregnations with pitch is increased, it is observed that such treatments become progressively less effective and it is not possible by means of this method to attain economically a density value of 1.75 g./cm.$^3$.

Another traditional method of preparing high-density graphite consists in incorporating with the mixture of coke and pitch such filler materials as micronized dust particles of carbon or graphite, of carbon black, etc. This method makes it possible to obtain the above-mentioned density value; moreover, it is thus possible to obtain carbonaceous supports having a pre-determined and fine porosity which are suitable for impregnation with thermosetting agents for the purpose of fabrication of impervious graphite. However, the practical operation of this technique requires careful handling; substantial difficulties arise during the fabrication process, in particular at the time of baking processes during which considerable precautions must be taken in order to prevent cracking of the products, especially when these latter are of substantial size.

The use of thermal cracking of gaseous hydrocarbons and, among others, methane, is a well known method of obtaining pyrolytic carbon.

This method has been employed at very high temperature for the fabrication of tubes or plates of pyrographite having a thickness which does not exceed a few millimeters. The products obtained have a high density but physical properties such as thermal and electrical conductivity, for example, are highly anisotropic; the field of application of such a product is accordingly very special.

Recourse has also been had to thermal cracking of gaseous hydrocarbons or hydrocarbon vapors for the purpose of developing at the surface of the carbon or graphite supports, or in the immediate vicinity of said surface, an impervious layer of pyrocarbon. These processes which are carried out at lower temperatures, namely in the vicinity of 1,000° C., have been successfully employed either alone or in combination with various impregnation processes for the purpose of fabricating tubes, plates, etc., of carbon or of graphite having satisfactory imperviousness.

It has of course also been endeavored to increase the density of carbonaceous masses by thermal cracking of hydrocarbons. Various methods have been devised for the purpose of preventing a reaction from taking place at the surface of the carbonaceous body, the result of such a reaction being to develop a surface film and thus prevent any further deposition of pyrocarbon in the porous structure as a whole.

Accordingly, propane has been caused to flow through the mass itself of the carbon to be densified by means of a suitable pressure difference. By processing at 850° C.–900° C., a 7 to 10% increase in mass has accordingly been achieved, but at the price of substantial complications which would make it impossible to carry such a process into practical effect on an industrial scale, the method employed being furthermore applicable only to tubes or, in extreme cases, to plates.

Despite the fact that it is particularly difficult to achieve such a result in a material having good heat conductivity such as graphite, attempts have also been made to maintain in the part to be processed a temperature gradient which is sufficiently substantial to ensure that the temperature at the surface is lower than the temperature of pyrolysis of hydrocarbon whereas the temperature in the interior is on the contrary sufficient to ensure that the cracking of the hydrocarbon takes place therein at an appreciable speed. Another method devised was to displace the heating zone along the part to be processed with the same object in view. It appears that it has not proved possible by this method to achieve increases in mass of more than a few percent, in spite of stringent conditions which it would be difficult to accept in an industrial enterprise and which are entailed in said method which is also applicable only to rods or tubes of small diameter.

The present invention has for its object a process for the densification of carbonaceous bodies which overcomes the disadvantages heretofore described and the operation of which is carried into effect in a very simple manner.

The above-mentioned process for the densification of carbonaceous bodies is essentially characterized in that the densification of said carbonaceous bodies is carried out by thermal cracking of hydrocarbons, said carbonaceous bodies having a porosity such that a proportion thereof which is at the most equal to 10% and which is as small as possible has a pore diameter which is smaller than 0.1 micron.

The said densification process can be carried out by means of a hydrocarbon which is either pure or diluted in an inert gas, either saturated or unsaturated, which belongs to the acyclic or cyclic series; it is also possible to employ hydrocarbon mixtures such as are met with in natural gases, for example the natural gas produced at Lacq (Southwest France).

It is possible to employ, for example, methane or cleaned natural gas in a carbonaceous support having a porosity such that a proportion thereof which is at least equal to 50% and which is as high as possible has a pore diameter in the range of 1 micron to 100 microns while a proportion of said porosity which is at the most equal to 10% and which is as small as possible has a pore diameter which is smaller than 0.1 micron.

Uncleaned natural gas can also be employed in a carbonaceous support, the pore spectrum of which contains a certain percentage of pores having diameters larger than 100 microns and which can reach, for example, values of the order of 200 microns or even more, up to 500 microns.

In accordance with the process which is contemplated by the present invention, if the carbonaceous support to be densified which is either graphitized or not and previously shaped or not has a porosity such that a proportion thereof which is at least equal to 50% and which is as high as possible has a pore diameter within the range of 1 micron to 100 microns while a proportion of said porosity which is at the most equal to 10% and which is as small as possible has a pore diameter which is smaller than 0.1 micron, said carbonaceous support is subjected, inside a chamber which is maintained at a temperature within the range of 800 to 1,000° C., to the action of a flow of methane under a pressure either equal to or higher than atmospheric pressure.

It is advantageous to choose for the linear velocity of flow of methane a value of the order of a few centimeters per second.

The processing time which is necessary for the purpose of obtaining an increase in the optimum mass and the accurate setting of the processing temperature are determined by experience as a function of the precise pore spectrum of the support to be treated, within the limits mentioned above.

The industrial application of this process is greatly facilitated by the conditions of temperatures and pressures which are necessary, and which permit of simple constructional design of the equipments and the use of materials which are entirely conventional. The use of methane, which is in plentiful supply and is inexpensive, in conjunction with temperatures below 1,000° C., facilitate both the design and construction of the processing furnaces and thus ensure the possibility of particularly easy and economical application on an industrial scale. The process can also be employed for the densification of cokes derived from various sources.

In accordance with the process for the densification of carbonaceous bodies as contemplated by the invention, methane can advantageously be replaced by cleaned natural gas, while the carbonaceous support which is employed at the outset has the same pore spectrum as that which was suitable for the use of methane. The cost of natural gas is very low and permits of even more economical application of the invention.

The starting product employed was a natural gas, in this instance the gas produced at Lacq in Southwest France, the methane content of which ranged from 92 to 96%. The said gas contained higher hydrocarbons: ethane (from 3% to 5%), propane (from 0.5% to 1%), nitrogen (from 0.5% to 2% approximately) and other impurities in much smaller quantities. Since the higher hydrocarbons bring about the formation of soots and the deposition of foreign matter, the natural gas was subjected to a cleaning process.

The said cleaning process is essentially characterized in that, before penetrating inside the chamber in which the densification process is effected, the natural gas having a higher-hydrocarbon content which it is necessary to reduce or eliminate flows through a carbon bed which is maintained at a temperature in the range of 820° C. to 840° C. The carbon bed can be made up of a carbonaceous substance which can have various physical appearances, for example granules or crushed fragments. In this manner the ethane and propane content is reduced to negligible or zero values, or to values which are in any case not liable to hinder the densification process.

In the case of an industrial application, it is possible to arrange within a same chamber both the bed of granular carbon materials and the carbon parts to be densified, the bed being located upstream from the carbon parts relatively to the stream of gas, arrangements being made to ensure that the temperature of the carbon bed is uniformly maintained within the range of 820° C. to 840° C. whereas the temperature of the said carbon parts is maintained at a temperature which is also substantially uniform and which is chosen between 870° C. and 950° C.

It is also possible in the case of an industrial application to choose the solution of two separate chambers, one for the preliminary processing of natural gas and the other for the densification treatment of the carbon parts. In this case, it can prove advantageous for continuous operation to make provision for two furnaces which are put into service in alternate sequence for the preliminary processing of natural gas with a view to providing the possibility of recovering periodically the bed of carbon granules in which the thermal decomposition of ethane and propane takes place. This material can subsequently be employed as a by-product, for example as a body material for the fabrication of carbonaceous supports which are intended for later densification.

The production of baked or graphitized supports which have previously been shaped or not and which have the necessary pore spectrum characteristics does not present any problem. There do exist graphite materials or "baked" semi-products made by absolutely ordinary processes and available at low prices which have acceptable pore spectrum characteristics. However, these carbonaceous products have a closed porosity which is not negligible inasmuch as it can represent up to 20% of the total porosity, which is a serious obstacle to good internal densification by thermal cracking of hydrocarbons.

In accordance with one of the advantageous features of the invention, the present applicants have perfected a process for the preparation of carbonaceous supports which makes it possible to make direct use of natural gas without any need to clean this latter; said process permits the possibility of obtaining in an economical manner a carbonaceous body which has the desired pore spectrum, wherein closed porosity is practically non-existent.

The process for the densification of carbonaceous bodies can be carried out by thermal cracking of the uncleaned natural gas, provided that the carbonaceous body has an average pore size which is larger than that which is suitable for the densification treatment by methane or cleaned natural gas, while said body must contain pores having a diameter which is larger than 100 microns and which can reach values of the order of 200 to 500 microns approximately. The process in accordance with the invention can accordingly be made even more economical by employing for the densification treatment an inexpensive gas without there being any need to subject this latter to a cleaning process.

It will be understood, however, that the densification process in accordance with the invention is applicable both to the carbonaceous bodies which are prepared by the process described in the present application as well as to those which are prepared by conventional methods.

After the densificaion treatment has been completed, carbonaceous bodies are obtained which are uniformly densified throughout, even when the thickness thereof reaches, for example, a few tenths of a millimeter. The densities of said bodies at this stage can reach as the case may be, 1.80 to 1.90 g./cm.$^3$ and, after a conventional graphitizing treatment, remain within the range of 1.75 to 1.85 g./cm.$^3$.

The preparation process is essentially characterized by the following points considered in combination:

(1) The material to be processed is provided in the form of a powder having a suitable particle-size distribution, of a carbonaceous body such as petroleum coke, graphite, pyrocarbon.

(2) The material to be processed is admixed with a binding agent and water in a quantity which is sufficient to obtain a paste having a plastic consistency; the binding agent must have a substantial swelling power in contact with water while the proportion of binding agent employed is always less than 10% and does not as a rule exceed 2 to 3% by weight of the mixture:material to be treated+binding agent (water excluded).

(3) The shaping operation is carried out at room temperature by any known means, the pressure applied being preferably less than 100 bars.

(4) The drying of the shaped products is carried out either in air at room temperature or at a temperature which is less than 100° C.

The carbonizing of the binding agent and possibly also the drying of the shaped products will be carried into effect during the increase in temperature inside the chamber which is employed for the densification treatment.

As will be brought out below, the process of the invention permits of particularly simple and economical working compared with the processes of the prior art.

The binding agent is chosen among the following products which are polysaccharides as considered alone or in combination: gums, mucilages, starches, alginates, molasses, methylcellulose substances, all of which have the property of having a high swelling power in contact with water. It should be noted that these products are both inexpensive and readily available.

The binding agent is admixed at room temperature with the carbonaceous dust which is chosen as body material such as petroleum coke or other cokes, graphite, pyrocarbon, etc. and with water in sufficient quantity to obtain a mass having a paste consistency. The proportion of binding agent contained in the mixture of body material and binding agent (water excluded) is less than 10% and does not as a rule exceed 2 to 3% by weight.

The paste is shaped either by molding or by extrusion, invariably at room temperature, while the pressure to be applied in this operation is not critical and can vary according to requirements from a few bars to a few tens of bars. It is not desirable, however, that said pressure should reach high values.

The body which is thus shaped can be handled and must be subjected to a drying treatment over a period of a few hours, in a kiln or drying oven for example, at a temperature between 50 and 90° C., these values being given solely by way of example. A simple air drying at room temperature is perfectly feasible and has the only disadvantage of being slow. In the case of extrusion, it is possible to carry out a continuous drying process directly at the outlet of the die. It is also possible to combine the densification process and the drying process, this latter being carried out at the time of progressive bringing up to temperature of the densification furnace.

After drying, the carbonaceous parts obtained have a density which usually ranges from 0.8 to 1.1 g./cm.$^3$; it remains possible to handle said parts, which are ready to be introduced in the densification furnaces in which the cracking of hydrocarbons takes place.

In order to give an idea of the satisfatcory mechanical strength of the parts at this stage, it may be stated that various physical measurements can be carried out thereon without difficulty.

The closed porosity of said parts which prevents access to gases is practically zero, whereas said closed porosity represents from 10 to 20% of the total porosity in the case of products which are baked and shaped by conventional methods.

The open porosity of said parts, irrespective of the selection of body materials chosen, is practically free of fine pores. In particular, those pores having a diameter less than 0.1 micron which, as has been pointed out, are detrimental to the densification process, represent as a rule approximately 1.7% of the total porosity and seldom exceed 3.5%. The corresponding values in the case of supports which are baked and shaped by conventional methods are 5 to 7% and sometimes exceed 10%.

Moreover, as has been stated in the foregoing, the carbonaceous bodies which are obtained after shaping and prior to densification have a structure which is distinguished by the absence of closed porosity and by the very small value of the fine porosity; this characteristic feature makes such carbonaceous bodies ready to serve as starting material for a wide range of applications.

The densified products obtained can be subjected to a conventional graphitization process in order to be thereby endowed with properties which are characteristic of the common industrial graphites (machinability, low coefficient of expansion, etc.). It is also useful to note that the practical application of the process of the invention makes it possible to obtain in a simple and economical manner high values in respect of density and imperviousness as well as a low anisotropy coefficient.

The present invention also has for its object, by way of new industrial products, the densified products whether graphitized or not which are obtained as a result of the practical application of the process in accordance with the invention, as well as the intermediate products obtained after shaping and prior to densification.

There now follows below a description of various examples which are not given in any limitative sense and which relate to the practical application of the process for the densification of carbonaceous bodies in accordance with the invention. The constructional arrangements which will be described in connection with these examples must be considered as forming part of the invention, it being understood that any and all equivalent arrangements can also be employed without thereby departing from the scope of the invention.

Examples 1, 2 and 3 relate to the process of densification by methane wherein the carbonaceous bodies offer a suitable pore spectrum and are constituted by industrial graphite.

Example 4 describes a process of densification by cleaned natural gas, of a carbonaceous body which is industrial graphite and which has a pore spectrum similar to that of the carbonaceous bodies which are treated by methane.

Examples 5 and 6 relate to a process of densification by natural gas, of supports which offer suitable porosity and which are prepared by means of the process in accordance with the invention.

*Example 1*

The material to be treated is an industrial graphite characterized by an initial density of 1.50 g./cm.$^3$ and a porosity in which a proportion of 70% has a pore diameter within the range of 2 to 100 microns while only 7% has a pore diameter which is smaller than one tenth of a micron. The said material was provided in the form of full cylinders 70 millimeters in diameter and 100 millimeters in length. The cylinders were processed in a resistance heating furnace fitted with a quartz laboratory tube, at a temperature of 925° C. for a period of 150 hours; the linear velocity of flow of methane in the interior of the furnace was 1.5 cm./sec. and the pressure was slightly higher than 1 bar. After cooling, it was observed that the density of the cylinder had increased to 1.75 g./cm.$^3$ without dimensional modification. The mechanical characteristics were substantially improved; crushing strength in particular was, after treatment, of the order of 500 bars (as against 260 bars at the outset). On the other hand, no modification of the coefficient of linear expansion was observed. The pore spectrum was extensively modified, so that the proportion of pores having diameters within the range of 20 to 100 microns fell from 19% to only 6%.

This improvement in the microstructure of the material is further illustrated by the substantial reduction in unit area which decreased from 0.5 m.$^2$/g. to 0.01 m.$^2$/g., which has an extremely favorable effect on resistance to corrosion by gas.

*Example 2*

The material to be treated is a conventional nuclear-grade industrial graphite having a density of 1.65 g./cm.$^3$. The proportion of pores having a diameter less than 0.1 micron was 9%. The said material was provided in the form of full cylinders 40 millimeters in diameter and 100 millimeters in length, and was processed under conditions similar to those described in Example 1; the temperature was maintained at 875° C. for a period of 300 hours. There was employed for the furnace a laboratory tube of sintered aluminum oxide, this material being well suited to the practical operation of the process (as is also the quartz material in the previous example).

After completion of the process, the density of the part was measured and it was found that said density was equal to 1.83 g./cm.$^3$. It should be noted that this value of density is achieved only at the cost of fairly substantial difficulties by means of conventional processes (involving at least three successive impregnations with pitch or a combination of the use of carbon black and impregnation with pitch) whereas said density value is obtained in this case in a simple manner.

*Example 3*

The material to be treated is a so-called "baked" semi-product which is obtained at the intermediate stage of the conventional graphite fabrication process. This material is provded in the form of prismatic blocks having a cross-sectional area in the vicinity of 3,600 mm.$^2$ and a height of approximately 100 millimeters. The density of the material is 1.54 g./cm.$^3$ and it is characterized by a porosity in which a proportion of 55% has a pore diameter within the range of 1 to 60 microns. The said material was processed under conditions similar to those described in the previous examples; the processing temperature was maintained at 900° C. for a period of 300 hours. The material was then subjected to a graphitization treatment at high temperature up to 2,700° C. at the same time as a reference part which had not been subjected to the densification by methane according to the process contemplated by the present invention. After graphitization, the reference part had a density of 1.54 g./cm.$^3$ whereas the part which had been treated had a density of 1.72 g./cm.$^3$.

*Example 4*

Provision is made for two furnaces which are heated electrically and through which natural gas ("gaz de Lacq") is caused to flow succesively for practical application of the densification process. The first furnace which has an internal diameter of 50 millimeters is packed with a bed of crushed graphite over a length of 300 millimeters, the brains of graphite having a granular size which is larger than 1 millimeter; this furnace is uniformly maintained at a temperature of 830° C. There is placed in the second furnace a graphite part having a pore spectrum which has the characteristics described in Example 1, and the temperature is maintained at 925° C. The gas flow rate at the inlet of the first furnace is equal to 15 liters per hour as measured under conditions of normal temperature and pressure.

At the inlet of the first furnace, the natural gas contains in particular: methane 94.5%, ethane 3.7%, propane 0.5%. At the outlet of the same furnace and prior to the admission of the natural gas in the densification furnace proper, it is noted that the proportion of ethane no longer amounts to more than 0.5% whereas the proportion of propane is zero and the hydrogen content which results from the thermal decomposition of the two above-mentioned hydrocarbons amounts to 7.8%; but this percentage is not troublesome. It is found that, after a processing time of 150 hours at 925° C. under these conditions, the density of the graphite part which is placed in the second furnace reaches the value of 1.75 g./cm.$^3$, which is identical to the density obtained at the time of the similar treatment with pure methane as described in Example 1.

*Example 5*

A quantity consisting of 98 parts of graphite dust having a particle size within the range of 80 to 160 microns is admixed when cold with 2 parts of vegetable gum with addition of a quantity of water which is sufficient to obtain a paste of thick consistency, namely approximately 35 parts.

This paste is shaped in molds as a result of the application of a pressure of the order of 10 bars and there are thus obtained cylinders 40 millimeters in diameter and 50 mililmeters in height. The said cylnders are then subjected to a kiln-drying process at 80° C. over a period of four hours.

The density of said cylinders at this stage is on an average 0.90 g./cm.$^3$; the closed porosity is practically zero while the porosity having a pore diameter of less than 0.1 micron represents on the average 2.8% of the total porosity.

The diameters of 60% of the pores vary between 3 and 100 microns while the diameters of 30% of the pores vary between 100 and 200 microns.

The cylinders are then treated as in the previous example in an electric muffle furnace and at a temperature of 900° C. over a period of 300 hours.

In order to take advantage of the characteristics of the pore spectrum obtained for the purpose of the shaping operation, there is employed for the densification treatment a flow of uncleaned natural gas in order to sweep the processing furnace at a linear flow velocity of 1 centimeter per second; the composition of the natural gas prior to its admission in the furnace is as follows: methane 93%–ethane 5%, propane 0.7%, nitrogen 1.2% and very low percentages of a few other impurities of various kinds.

The density of the densified products is on an average 1.85 g./cm.$^3$.

A conventional process of graphitization of a certain number of parts which have thus been densified is carried out at a maximum temperature of 2,800° C. The density thus obtained is on an average 1.83 g./cm.$^3$. The graphitized parts are perfectly machinable in the same manner as standard industrial graphite and test sections for various physical measurements can be prepared and measured. It can be noted in particular that the coefficient of linear expansion is 3.0 10$^{-6}$ between 80° K. and room temperature, and offers good constancy throughout the entire product and irrespective of the orientation of the test section in this latter. The electric resistance of said parts as measured at 20° C. is 2,000 micro-ohms/cm./cm.$^2$ while the mechanical crushing-strength thereof is 1 T/cm$^2$. It is useful to note the very low anisotropy of the product which is obtained, this latter having an average value of 1.06.

*Example 6*

A tube is prepared which has an internal diameter of 25 millimeters and an external diameter of 35 millimeters in accordance with a procedure which is identical to the mode of operation described in Example 5, except for the shaping operation and the proportions of constituents (extrusion of a paste made up of 98 parts of petroleum coke dust as body material, 2 parts of rice starch, 40 parts water). The petroleum coke which is employed has a grain size within the range of 125 to 200 microns.

All the other operations are carried out as has been stated in Example 5; the densification requires a processing time of 150 hours at 925° C. and 200 hours at 900° C., the uncleaned natural gas being employed as a source of carbon. The density of the tube after treatment is 1.85 g./cm.$^3$ and its perviousness to gases is characterized by a coefficient K which is equal to 1.2 10$^{-4}$ cm.$^2$/sec.

It follows from Examples 5 and 6 that the essential advantage of the shaping technique is that it permits the fabrication of carbonaceous supports which are perfectly adapted to the subsequent densification treatment by thermal decomposition of hydrocarbons, and at a cost which is lower than that of traditional methods. It will in fact be noted that, in accordance with the invention, the support is fabricated as a result of a simple shaping operation at room temperature and, after drying, is ready for the densification process. These two last operations can furthermore be combined. There is thus eliminated a thermal polymerization treatment and carbonizing which remain necessary in any other process.

What we claim is:

1. A process for the densification of carbonaceous bodies consisting of the steps of preparing porous carbonaceous bodies in which the proportion of pores having a diameter of less than 0.1 micron is at most equal to 10% and the proportion of pores having a diameter between 1 and 100 microns is at least equal to 50% and then densifying said carbonaceous bodies by thermal cracking of a gaseous hydrocarbon selected from the group consisting of methane and cleaned natural gas at a temperature between 800 and 1000° C.

2. A process for the densification of carbonaceous bodies consisting of the steps of preparing porous carbonaceous bodies in which the proportion of pores having a diameter less than 0.1 micron is at most equal to 10% and containing pores of diameter greater than 100 microns and up to 500 microns and then densifying the carbonaceous bodies by thermal cracking of an uncleaned natural gas at a temperature between 800 and 1000° C.

3. A process for the densification of carbonaceous bodies consisting of the steps of preparing porous carbonaceous bodies in which the proportion of pores having a diameter less than 0.1 micron is at most equal to 10% and having a proportion thereof at least equal to 50% and as high as possible of a pore diameter of from 1–500 microns and then densifying said bodies by thermal cracking of a gaseous hydrocarbon selected from the group consisting of methane and uncleaned and cleaned natural gas at temperatures less than but approximating 1000° C., methane and cleaned natural gas being used for pore sizes between 1 and 100 microns at temperatures between 800–1000° C. and uncleaned natural gas being used for pore sizes between 100 and 500 microns at temperatures between 800–1000° C., said porous carbonaceous bodies being prepared by first mixing powdered carbonaceous material selected from the group consisting of coke, graphite and pyrocarbon with a polysaccharide binding agent and water to form a paste having a plastic consistency, said binding agent having a substantial swelling power in contact with water, the proportion of said binding agent being 2–3% by weight of the carbonaceous material, then shaping said mixture and then drying the resulting shapes during heating of the chamber employed in the densification process.

4. Process for the densification of carbonaceous bodies in accordance with claim 3, characterized in that the cleaning of natural gas is carried out by causing said gas to flow through a carbon bed which is maintained at a temperature within the range of 820° C. to 840° C., said carbon bed being granules or crushed fragments.

References Cited by the Examiner

UNITED STATES PATENTS

| | | | |
|---|---|---|---|
| 2,883,708 | 4/1959 | Sem | 264—29 X |
| 2,922,722 | 1/1960 | Hutcheon | 117—46 |
| 3,084,394 | 4/1963 | Bickerdike et al. | 117—46 |

ALFRED L. LEAVITT, *Primary Examiner.*

RALPH S. KENDALL, *Examiner.*

W. L. SOFFIAN, H. COHEN, *Assistant Examiners.*